United States Patent
Hofmann et al.

(10) Patent No.: US 12,370,535 B2
(45) Date of Patent: Jul. 29, 2025

(54) PROCESS FOR PREPARING DOUBLE METAL CYANIDE CATALYSTS

(71) Applicant: Covestro Deutschland AG, Leverkusen (DE)

(72) Inventors: Joerg Hofmann, Krefeld (DE); Maria Gleixner, Kempen (DE); Thomas Asma, Tönisvorst (DE)

(73) Assignee: Covestro Deutschland AG, Leverkusen (DE)

(*) Notice: Subject to any disclaimer, the term of this patent is extended or adjusted under 35 U.S.C. 154(b) by 487 days.

(21) Appl. No.: 17/797,161

(22) PCT Filed: Feb. 17, 2021

(86) PCT No.: PCT/EP2021/053814
§ 371 (c)(1),
(2) Date: Aug. 3, 2022

(87) PCT Pub. No.: WO2021/165283
PCT Pub. Date: Aug. 26, 2021

(65) Prior Publication Data
US 2023/0046210 A1   Feb. 16, 2023

(30) Foreign Application Priority Data

Feb. 22, 2020 (EP) .................... 20158908
Oct. 15, 2020 (EP) .................... 20202031

(51) Int. Cl.
*B01J 27/26* (2006.01)
*B01J 37/04* (2006.01)
*C08G 65/26* (2006.01)

(52) U.S. Cl.
CPC .............. *B01J 27/26* (2013.01); *B01J 37/04* (2013.01); *C08G 65/2663* (2013.01)

(58) Field of Classification Search
CPC .......... B01J 27/26; B01J 37/04; C08G 65/2663
(Continued)

(56) References Cited

U.S. PATENT DOCUMENTS 3,404,109 A    10/1968   Milgrom
3,829,505 A     8/1974   Herold
(Continued)

FOREIGN PATENT DOCUMENTS

CN        1589966 A     3/2005

OTHER PUBLICATIONS

English translation of Written Opinion for PCT/EP2021/053814. (Year: 2021).*
(Continued)

*Primary Examiner* — Patricia L. Hailey
(74) *Attorney, Agent, or Firm* — Donald R. Palladino (57) ABSTRACT

The present invention relates to a process for preparing a double metal cyanide (DMC) catalyst, comprising the reaction of an aqueous solution of a cyanide-free metal salt, an aqueous solution of an alkaline metal cyanide salt, an organic complex ligand and optionally a complex-forming component, wherein the metal cyanide salt is one or more compound(s) and is selected from the group consisting of potassium hexacyanocobaltat(III), potassium hexacyanoferrate(II), potassium hexacyanoferrate(III), calcium hexacyanocobaltate(III) and lithium hexacyanocobaltat(III), where the organic complex ligand is one or more compound(s) and is selected from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol, and wherein the alkaline metal cyanide salt used has an alkalinity by the titration method disclosed in the Experimental of between 0.700% and 3.000% by weight of sodium hydroxide (NaOH) based on the total weight of the
(Continued)

alkaline metal cyanide salt used. The invention further relates to double metal cyanide (DMC) catalysts obtainable by the process according to the invention and to the use of DMC catalysts for preparation of polyoxyalkylene polyols.

19 Claims, 3 Drawing Sheets

(58) Field of Classification Search
USPC .......................................................... 502/175
See application file for complete search history.

(56) References Cited

U.S. PATENT DOCUMENTS

| | | | |
|---|---|---|---|
| 3,941,849 A | 3/1976 | Herold | |
| 5,158,922 A | 10/1992 | Hinney et al. | |
| 5,470,813 A | 11/1995 | Le-khac | |
| 5,482,908 A | 1/1996 | Le-khac | |
| 5,545,601 A | 8/1996 | Le-khac | |
| 5,627,120 A | 5/1997 | Le-khac | |
| 5,712,216 A | 1/1998 | Le-khac et al. | |
| 5,714,428 A | 2/1998 | Le-khac | |
| 5,783,513 A | 7/1998 | Combs et al. | |
| 5,955,534 A * | 9/1999 | Simroth | C08G 18/632 524/502 |
| 6,716,788 B2 | 4/2004 | Eleveld et al. | |
| 6,780,813 B1 | 8/2004 | Hofmann et al. | |
| 7,008,900 B1 | 3/2006 | Hofmann et al. | |
| 8,946,466 B2 * | 2/2015 | Gurtler | C07C 68/04 558/266 |
| 9,315,622 B2 | 4/2016 | Hofmann et al. | |
| 11,571,690 B2 * | 2/2023 | Steelman | B01J 37/06 |
| 2006/0058182 A1 | 3/2006 | Combs et al. | |
| 2013/0123532 A1 | 5/2013 | Gürtler et al. | |
| 2021/0308657 A1 | 10/2021 | Hofmann et al. | |

OTHER PUBLICATIONS

Bratsch, Robert, "Untersuchungen zur Dimetallcyanidkatalysierten Copolymerisation von Propylenoxid und Kohlenstoffdioxid," Dissertation Universitat Rostock, Jul. 2013, Retrieved from the Internet: <URL: https://rosdok.uni-rostock.de/file/rosdok_disshab_0000001308/rosdok_derivate_0000023844/Dissertation_Bratsch_2015.pdf>, pp. 1-128.

Chen et al., "Fe/Zn double metal cyanide (DMC) catalyzed ring-opening polymerization of propylene oxide" Progress In Organic Coatings, May 28, 2004, vol. 50, No. 4, pp. 269-272.

Ullmann's Encyclopedia of Industrial Chemistry, vol. B2, Weinheim, Wiley-VCH, 1988, Chapters 9 and 10.

International Search Report PCT/EP2021/053814, date of mailing: Aug. 26, 2021, Authorized officer: Matthias Goebel.

Hollemann-Wiberg, Lehrbuch der Anorganischen Chemie, Inorganic Chemistry, 101st edition, de Gruyter, 1995, pp. 1552-1553.

* cited by examiner

Fig. 5

PROCESS FOR PREPARING DOUBLE METAL CYANIDE CATALYSTS

CROSS-REFERENCE TO RELATED APPLICATIONS

This application is a national stage application under 35 U.S.C. § 371 of PCT/EP2021/053814, filed Feb. 17, 2021, which claims the benefit of European Application No. 20158908.2, filed Feb. 22, 2020, and European Application No. 20202031.9, filed Oct. 15, 2020, each of which is incorporated herein by reference.

FIELD

The present invention relates to a process for preparing a double metal cyanide catalyst (DMC) comprising the reaction of an aqueous solution of a cyanide-free metal salt, an aqueous solution of an alkaline metal cyanide salt, an organic complex ligand and optionally a complex-forming component, wherein the metal cyanide salt is one or more compound(s) and is selected from the group consisting of potassium hexacyanocobaltate(III), potassium hexacyanoferrate(II), potassium hexacyanoferrate(III), calcium hexacyanocobaltate(III) and lithium hexacyanocobaltate(III), wherein the organic complex ligand is one or more compound(s) and is selected from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol, and wherein the alkaline metal cyanide salt used has an alkalinity by the titration method disclosed in the Experimental of between 0.700% and 3.000% by weight sodium hydroxide (NaOH), based on the total weight of the alkaline metal cyanide salt used. The subject matter of the invention further encompasses double metal cyanide catalysts (DMC) obtainable by the process according to the invention and also the use of the DMC catalysts for the preparation of polyoxyalkylene polyols.

BACKGROUND

DMC catalysts are known in principle from the prior art (see, for example, U.S. Pat. Nos. 3,404,109, 3,829,505, 3,941,849, and 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity in the homopolymerization of epoxides and enable the preparation of polyether polyols at very low catalyst concentrations (25 ppm or lower), such that removal of the catalyst from the finished product is generally no longer required. A typical example is that of the highly active DMC catalysts which are described in EP-A 700 949 and contain not only a double metal cyanide compound (e.g. zinc hexacyanocobaltate(III)) and an organic complex ligand (e.g. tert-butanol) but also a polyether having a number-average molecular weight greater than 500 g/mol.

U.S. Pat. No. 5,783,513 discloses a process for preparing substantially amorphous DMC catalysts in which the metal salt such as for example zinc chloride for the catalyst preparation has an alkalinity (expressed in % by weight ZnO) of between 0.2% and 2% by weight.

EP 1 634 644 A1 discloses a process for preparing substantially amorphous DMC catalysts by reacting metal salt and metal cyanide salt with a low molar ratio of less than 2.9:1 and an alkalinity content of the metal salt of at least 2% by weight based on the metal oxide.

U.S. Pat. No. 6,716,788 discloses a process for preparing DMC catalysts by reacting a metal salt such as for example zinc chloride with a metal cyanide salt such as for example potassium hexacyanocobaltate in the presence of 0.03-0.4 mol of an alkaline metal compound, based on the amount of metal salt.

WO 2011/144523 A1 discloses a process for preparing polyethercarbonate polyols from one or more H-functional starter substances, one or more alkylene oxides and carbon dioxide in the presence of at least one double metal cyanide catalyst, wherein the cyanide-free metal salt, metal cyanide salt, or both mentioned salts, used for the preparation of the double metal cyanide catalyst is/are reacted in the presence of 0.3 to 1.8 mol of base equivalents (based on 1 mol of the metal cyanide salt used for the catalyst synthesis) of alkaline metal hydroxide, metal carbonate and/or metal oxide. These DMC catalysts lead to an improved selectivity favoring the formation of linear polyethercarbonate polyols and/or a minimum ratio of cyclic carbonate to linear polyethercarbonate.

EP 700 949 A2 describes a DMC catalyst, containing DMC compound, an organic complex ligand and 5%-80% by weight of a polyether having a number-average molecular weight of >500 g/mol. The catalysts used generally possess an activity in the preparation of polyether polyols.

EP 3 608 018 A1 discloses a process for preparing a double metal cyanide catalyst (DMC) comprising the reaction of an aqueous solution of a cyanide-free metal salt, an aqueous solution of a metal cyanide salt, an organic complex ligand and a complex-forming component, to form a dispersion, wherein the reaction is effected using a mixing nozzle and wherein the process temperature of the dispersion during the reaction is between 26° C. and 49° C. The latter disclosure also relates to double metal cyanide catalysts (DMC) obtainable by the disclosed process and also to the use of the DMC catalysts for the preparation of polyoxyalkylene polyols.

The relevance of the alkalinity of the metal cyanide salt used in the preparation of the DMC dispersion and the influence thereof on the DMC catalyst activity for the formation of polyoxyalkylene polyols is not disclosed in the prior art.

BRIEF DESCRIPTION OF THE DRAWINGS

Various features and characteristics of the inventions described in this specification may be better understood by reference to the accompanying figures, in which.

DETAILED DESCRIPTION

The object of the present application was to provide an improved process for preparing double metal cyanide (DMC) catalysts having further increased catalytic activity in the preparation of polyoxyalkylene polyols, preferably polyether polyols and/or polyethercarbonate polyols, this improved activity resulting in a reduced product viscosity for example in the catalyst test according to the "8K diol stressed tests" described for example in WO 98/16310 A1. The aim was thus to provide catalytically more active DMC catalysts which lead to polyoxyalkylene polyols, preferably polyether polyols and/or polyethercarbonate polyols, having a reduced viscosity, which facilitates the further processability of the polyoxyalkylene polyols in the subsequent polyurethanization reaction. The increased catalyst activity moreover enables a reduction in the amount of catalyst used, which improves the economic viability of the process.

Surprisingly, it has now been found that a process for preparing a double metal cyanide catalyst (DMC) comprising i) reaction of an aqueous solution of a cyanide-free metal salt, an aqueous solution of an alkaline metal cyanide salt, an organic complex ligand and optionally a complex-forming component, wherein the metal cyanide salt is one or more compound(s) and is selected from the group consisting of potassium hexacyanocobaltate (III), potassium hexacyanoferrate(II), potassium hexacyanoferrate(III), calcium hexacyanocobaltate(III) and lithium hexacyanocobaltate(III), wherein the organic complex ligand is one or more compound(s) and is selected from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol, characterized in that the alkaline metal cyanide salt used has an alkalinity by the titration method disclosed in the Experimental of between 0.700% and 3.000% by weight sodium hydroxide (NaOH), based on the total weight of the alkaline metal cyanide salt used, achieves the above-mentioned object.

Cyanide-free metal salts suitable for preparation of the double metal cyanide compounds preferably have the general formula (I)

$$M(X)_n \quad (I)$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate and n is 2 when X=halide, hydroxide, cyanate, thiocyanate, isocyanate, isothiocyanate or nitrate, or suitable cyanide-free metal salts have the general formula (II)

$$M_r(X)_3 \quad (II)$$

where

M is selected from the metal cations $Fe^{3+}$, $Al^{3+}$ and $Cr^{3+}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate and r is 1 when X=halide, hydroxide, cyanate, thiocyanate, isocyanate, isothiocyanate, carboxylate or nitrate, or suitable cyanide-free metal salts have the general formula (III)

$$M(X)_s \quad (III)$$

where

M is selected from the metal cations $Mo^{4+}$, $V^{4+}$ and $W^{4+}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate and s is 4 when X=halide, hydroxide, cyanate, thiocyanate, isocyanate, isothiocyanate, carboxylate or nitrate, or suitable cyanide-free metal salts have the general formula (IV)

$$M(X)_t \quad (IV)$$

where

M is selected from the metal cations $Mo^{6+}$ and $W^{6+}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate and t is 6 when X=halide, hydroxide, cyanate, thiocyanate, isocyanate, isothiocyanate, carboxylate or nitrate.

In a preferred embodiment of the process according to the invention, the cyanide-free metal salt of the aqueous solution of a cyanide-free metal salt is one or more compound(s) and is selected from the group consisting of zinc chloride, zinc bromide, zinc iodide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel(II) chloride and nickel(II) nitrate.

In the process according to the invention, the alkaline metal cyanide salt used has an alkalinity of between 0.700% and 3.000% by weight sodium hydroxide (NaOH), based on the total weight of the alkaline metal cyanide salt used, where the alkalinity has been determined by the titration method disclosed in the Experimental with 0.1 mol/l of hydrochloric acid. Here, in accordance with the generally known Brønsted acid-base concept, the alkalinity according to the invention is understood to mean the amount of Brønsted acid that has to be added to a Brønsted base-containing system, in the present invention an alkaline metal cyanide salt, to achieve neutralization of this alkaline metal cyanide salt, i.e. to achieve a pH of 7. In the present case, Brønsted acids are understood to be compounds which can donate protons (proton donors), with Brønsted bases being understood accordingly to be compounds which can accept protons (proton acceptors). Examples of Brønsted acids include hydrochloric acid, nitric acid or sulfuric acid, where metal hydroxides, metal carbonates and/or metal oxides can be mentioned as examples of Brønsted bases.

In one embodiment of the process according to the invention, the alkalinity is between 0.700% and 2.000% by weight NaOH, preferably between 0.800% and 1.500% by weight NaOH, where the alkalinity is determined by the titration method disclosed in the Experimental. Especially for the alkalinity between 0.800% and 1.500% by weight NaOH, this again leads to an improved catalyst activity and thus to polyether polyols and/or polyethercarbonate polyols having a reduced viscosity.

In the process according to the invention, an alkaline metal cyanide salt is understood to be a metal cyanide salt defined below which has an alkalinity of between 0.700% and 3.000% by weight, based on the total weight of the alkaline metal cyanide salt used, which has been determined in accordance with the titration method disclosed in the Experimental. Here, the alkalinity of the process according to the invention is defined as described above.

In one embodiment of the process according to the invention, the alkaline metal cyanide salt used contains a metal hydroxide, a metal carbonate and/or a metal oxide, wherein the metal hydroxide, the metal carbonate and/or the metal oxide is responsible for the alkalinity of the alkaline metal cyanide salt.

In one embodiment of the process according to the invention, the alkaline metal cyanide salt used is obtainable by addition of the metal hydroxide, the metal carbonate and/or the metal oxide during the preparation of the alkaline metal cyanide salt. In this case, suitable amounts of solutions of the metal hydroxide, metal carbonate and/or metal oxide may be added during the preparation of the metal cyanide salt. For instance, solutions of the metal hydroxide, metal carbonate and/or metal oxide such as for example sodium or potassium hydroxide may be added during the reaction of alkali and/or alkaline earth metal cyanide solutions, such as for example potassium cyanide or sodium cyanide solutions, and metal halide solutions, such as for example cobalt halide, nitrate or sulfate solutions.

In an alternative embodiment of the process according to the invention, the alkaline metal cyanide salt used is obtainable by reaction of a metal cyanide salt with the metal hydroxide, the metal carbonate and/or the metal oxide. Here, the metal cyanide salt, for example potassium hexacyanocobaltate(III), in a first process step is prepared by methods known to those skilled in the art (potassium hexacyanocobaltate(III), Hollemann-Wiberg, Lehrbuch der Anorganischen Chemie [Inorganic Chemistry], 101st edition, de Gruyter, pages 1552-1553) and is subsequently mixed with appropriate amounts of metal hydroxide, metal carbonate and/or metal oxide, such as for example potassium hydroxide and/or sodium hydroxide, the respective solids of the metal cyanide salt being mixed with the metal hydroxide, the metal carbonate and/or the metal oxide in a suitable manner (mixing elements). Alternatively, suspensions and/or solutions of the metal cyanide salt, such as for example an aqueous potassium hexacyanocobaltate(III) solution, may also be mixed with suspensions or solutions of the metal hydroxide, metal carbonate and/or metal oxide, such as for example an aqueous potassium hydroxide and/or sodium hydroxide solution, and the suspension medium or solvent can then be removed in a suitable manner so as to result in an alkaline metal cyanide salt, such as for example alkaline potassium hexacyanocobaltate(III).

In one embodiment of the process according to the invention, one or more metals of the first or second main group of the periodic table of the elements are used as metal hydroxide, metal carbonate and/or metal oxide (see for example "Handbook of Chemistry and Physics, 63rd Edition").

In one embodiment of the process according to the invention, the alkaline metal hydroxide, metal oxide and/or metal carbonate is one or more compounds and is selected from the group consisting of sodium carbonate, sodium hydroxide, potassium hydroxide, potassium carbonate, calcium oxide, calcium hydroxide, barium hydroxide and barium oxide.

In the process according to the invention, the metal cyanide salt of the aqueous solution of a metal cyanide salt is one or more compound(s) and is selected from the group consisting of potassium hexacyanocobaltate(III), potassium hexacyanoferrate(II), potassium hexacyanoferrate(III), calcium hexacyanocobaltate(III) and lithium hexacyanocobaltate(III), preferably potassium hexacyanocobaltate(III).

Preferred double metal cyanide compounds present in the DMC catalysts according to the invention are compounds of the general formula (V)

$$M_x[M'_{x'}(CN)_y]_z \qquad (V),$$

where M is as defined in formula (I) to (IV) and
M'=Co(III), Fe(II) or Fe(III), and
x, x', y and z are integers and are selected such as to ensure the electronic neutrality of the double metal cyanide compound.

It is preferable when
x=3, x'=1, y=6 and z=2,
M=Zn(II), Fe(II), Co(II) or Ni(II) and
M'=Co(III) or Fe(III).

In a preferred embodiment of the process according to the invention, the double metal cyanide compound is one or more compound(s) and is selected from the group consisting of zinc hexacyanocobaltate(III), zinc hexacyanoferrate(III) and cobalt(II) hexacyanocobaltate(III). Particular preference is given to using zinc hexacyanocobaltate(III).

In the process according to the invention, the organic complex ligand is one or more compound(s) and is selected from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol, preferably tert-butanol.

In one embodiment of the process according to the invention, a complex-forming component is used.

The complex-forming component according to the invention can be selected from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose and polyacetals, or of the glycidyl ethers, glycosides, carboxylic esters of polyhydric alcohols, esters or amides, cyclodextrins and/or phosphorus compounds.

In the process according to the invention for preparing the DMC catalysts, as complex-forming component, polyethers are preferably used.

In a preferred embodiment, the polyether has a number-average molecular weight of ≥500 g/mol, the number-average molecular weight being calculated from the determined OH number.

OH numbers are determined according to the method of DIN 53240.

Suitable polyethers include those which are prepared by means of the ring-opening polymerization of cyclic ethers, these cyclic ethers for example also comprising oxetane polymers and also tetrahydrofuran polymers. Any form of catalysis is possible for this purpose. The polyether has suitable end groups here, such as for example hydroxyl, amine, ester or ether end groups.

In a particularly preferred embodiment, the polyether has an average hydroxyl functionality of from 2 to 8 and a number-average molecular weight in the range from 500 g/mol to 10 000 g/mol, preferably of from 700 g/mol to 5000 g/mol, the number-average molecular weight being calculated from the determined OH number.

In a particularly preferred embodiment, the polyethers are polyether polyols, the polyether polyols being obtained by reaction of alkylene oxides and H-functional starter compounds in the presence of acidic, basic and/or organometallic catalysts. These organometallic catalysts are for example double metal cyanide catalysts (DMC).

Suitable polyether polyols are poly(oxypropylene) polyols, poly(oxypropyleneoxyethylene) polyols, polytetramethylene ether glycols and block copolymers containing poly(oxy)ethylene, poly(oxy)propylene and/or poly(oxy)butylene blocks, such as for example poly(oxy)ethylene-poly(oxy)propylene block copolymers having terminal poly(oxy)ethylene blocks.

In a preferred embodiment, the polyether polyol is a poly(oxypropylene) polyol having a number-average molecular weight of ≥500 g/mol, the number-average molecular weight being calculated from the determined OH number.

In a particularly preferred embodiment, the polyether polyol is a poly(oxypropylene) polyol, preferably a poly(oxypropylene) diol and/or a poly(oxypropylene) triol having a number-average molecular weight of 700 g/mol to 4000 g/mol, the number-average molecular weight being calculated from the determined OH number.

In an alternative embodiment, the polyethers have an average hydroxyl functionality of from 2 to 8 and a number-average molecular weight in the range from 150 g/mol to less than 500 g/mol, preferably of from 200 g/mol to 400 g/mol, the number-average molecular weight being calculated from the determined OH number.

In a preferred alternative embodiment, the alternative polyethers are polyether polyols, these alternative polyether polyols having an average hydroxyl functionality of from 2 to 8 and a number-average molecular weight in the range from 150 g/mol to less than 500 g/mol, preferably an average hydroxyl functionality of from 2 to 8 and a number-average molecular weight in the range from 200 g/mol to 400 g/mol, the number-average molecular weight being calculated from the determined OH number. These alternative polyether polyols are likewise obtained by reaction of alkylene oxides and H-functional starter compounds in the presence of acidic, basic and/or organometallic catalysts. These organometallic catalysts are for example double metal cyanide catalysts (DMC).

Suitable alternative polyether polyols are poly(oxypropylene) polyols, poly(oxypropyleneoxyethylene) polyols, polytetramethylene ether glycols and block copolymers containing poly(oxy)ethylene, poly(oxy)propylene and/or poly(oxy)butylene blocks, such as for example poly(oxy)ethylene-poly(oxy)propylene block copolymers having terminal poly(oxy)ethylene blocks. Tripropylene glycol, triethylene glycol, tetrapropylene glycol, tetraethylene glycol, dipropylene glycol monomethyl ether, tripropylene glycol monomethyl ether, and monoalkyl and dialkyl ethers of glycols and poly(alkylene glycol)s are furthermore also suitable.

In a particularly preferred alternative embodiment, the alternative polyether polyol is a polypropylene glycol and/or a polyethylene glycol having a number-average molecular weight in the range from 150 g/mol to less than 500 g/mol, the number-average molecular weight being calculated from the determined OH number.

In one embodiment of the process according to the invention, the DMC catalyst dispersion is prepared using a mixing nozzle (for example a smooth jet nozzle, Levos nozzle, Bosch nozzle and the like), preferably a jet disperser, as is described in the patent application WO 01/39883 A1.

Through this, the preparation process of the DMC catalyst dispersion is possible with a comparably simple apparatus setup, a low energy expenditure for the shearing, a good temperature control, and also a likewise good scalability compared to known industrial processes, in order to realize a simple implementation in existing DMC catalyst preparation processes, for example in loop reaction.

Figure 1:
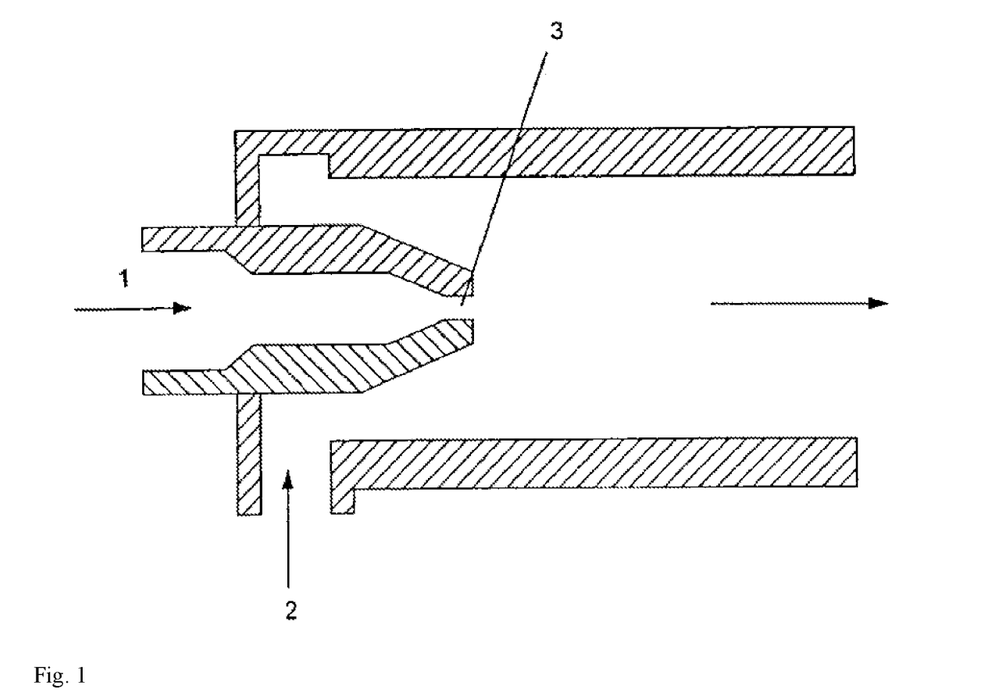
FIG. 1 shows the schematic structure of a simple smooth jet nozzle, in simplified form, a plant for concentrating waste acid from a process for nitration of toluene to give dinitrotoluene (DNT)

The basic structure and mode of operation of suitable mixing nozzles will be described hereinbelow. FIG. 1 shows the schematic structure of a simple smooth jet nozzle. The reactant stream 1 is first accelerated in the nozzle 3 and sprayed at a high flow speed into the slow-flowing reactant stream 2. In the process, reactant stream 2 is accelerated and reactant stream 1 is decelerated. Part of the kinetic energy of reactant jet 1 is converted into heat in this process and is thus no longer available for the mixing operation. The two reactant streams are subsequently mixed via the turbulent decay of the resulting jet into vortices of different sizes (vortex cascade). Compared to a stirred tank, concentration differences can be reduced much more rapidly in this way, as much greater and more homogeneous power densities can be achieved. The average power density P is calculated here by the following formula:

$$P = \frac{\Delta p \cdot \dot{V}}{V}$$

where: Δp: pressure drop in the nozzle
 $\dot{V}$: volume flow rate
 V: volume of the nozzle bore The use of such nozzles will be designated hereinbelow as method 1.

In a smooth jet nozzle, a first reactant stream is first accelerated in a nozzle and sprayed at a high flow speed into a slow-flowing second reactant stream. The two reactant streams are subsequently mixed via the turbulent decay of the resulting jet into vortices of different sizes (vortex cascade). Compared to a stirred tank, concentration differences can be reduced much more rapidly in this way, as much greater and more homogeneous power densities can be achieved.

Figure 2:
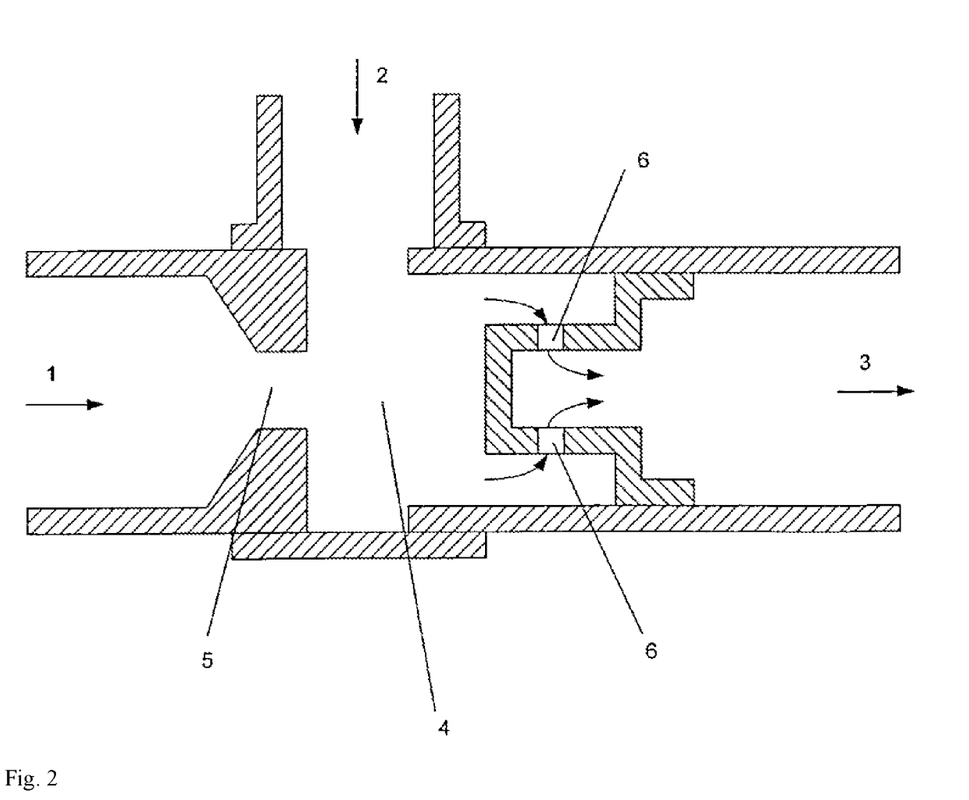
FIGS. 2 and 3 illustrate a jet disperser suitable for use in the process of this specification.
Figure 3:
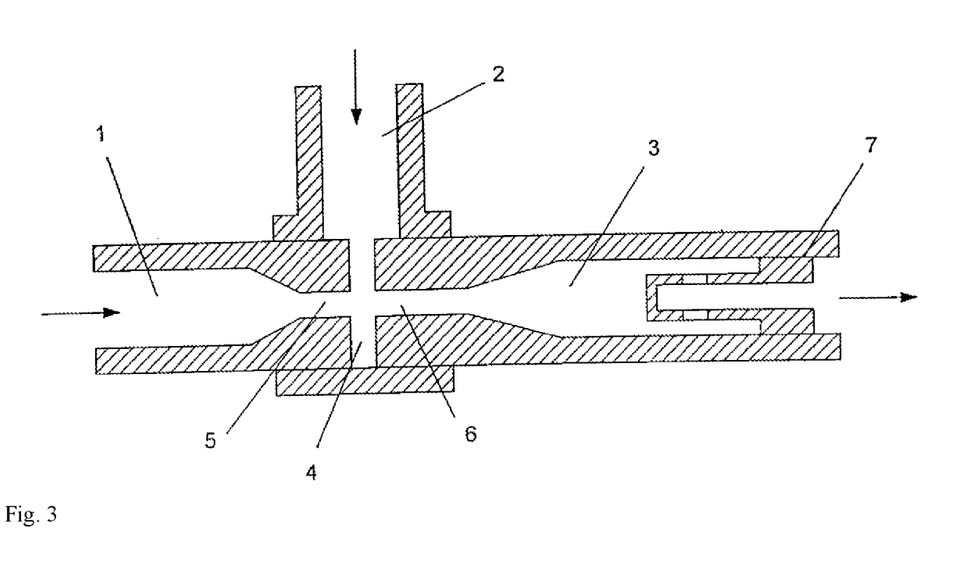

Preference is given to using a jet disperser as is illustrated in FIG. 2 or FIG. 3 for the process according to the invention. The jet disperser can be constructed (FIG. 2) such that two nozzles 5 and 6 are arranged in succession. The reactant stream 1 is first greatly accelerated in the nozzle 5 by the cross-sectional constriction. The accelerated jet in the process draws in the second component due to the high flow speed. The spacing of the nozzles is preferably selected so that only nucleation, but no crystal growth, occurs in the mixing chamber 4 on account of the short residence time. The decisive factor for the optimal design of the jet disperser is thus the nucleation rate of the solid. A residence time of 0.0001 s to 0.15 s, preferably 0.001 s to 0.1 s, is advantageously set. Crystal growth does not take place until in the outlet 3. The diameter of the nozzles 6 should preferably be selected so that the partially mixed reactant streams are accelerated further there. Due to the shear forces additionally arising as a result in the nozzles 6, compared to method 1, the state of homogeneous mixing is achieved in a shorter time because of a more rapid vortex decay. As a result, in contrast to method 1, it is possible even in the case of precipitation reactions with a very high nucleation rate to achieve the state of ideal mixing of the reactants, so that the setting of defined stoichiometric compositions during the precipitation reaction is possible. Nozzle diameters of from 5000 μm to 50 μm, preferably 2000 μm to 200 μm, have proven to be advantageous with pressure drops in the nozzle of 0.1 bar to 1000 bar or power densities in the range from $1*10^7$ W/m$^3$ to $1*10^{13}$ W/m$^3$. This mixing process will be designated hereinbelow as method 2.

Depending on the desired particle size, a further n nozzles (with n=1-5) may be connected downstream so as to obtain a multistage jet disperser. FIG. 3 shows such a multistage jet disperser. Following the nozzle 6, the dispersion is once more guided through the nozzle 7. For the design of the nozzle diameter, the same applies as for nozzle 6.

The additional advantage of further dispersers compared to method 2 consists in that particles which have already formed can be mechanically comminuted by the large shear forces in the nozzles. In this way it is possible to produce particles having diameters of from 10 μm to 0.1 μm. Instead of a plurality of nozzles connected in series, comminution can also be achieved by circulating the dispersion. The use of such nozzles will be identified hereinbelow as method 3.

The energy dissipation in the nozzles and the enthalpy of crystallization can result in heating of the dispersion. Since the temperature can have a substantial influence on the crystal formation process, a heat transfer means may be installed downstream of the mixing element for the isothermal process regime.

A problem-free scale-up is for example possible by using a greater number of bores, connecting a plurality of mixing elements in parallel or enlarging the free nozzle area. However, the latter is not achieved by increasing the nozzle diameter, as this gives rise to the possibility of the occurrence of a core flow which results in a deterioration in the mixing result. For nozzles having large free nozzle areas, it is therefore preferable to use slits having a corresponding area.

Figure 4:
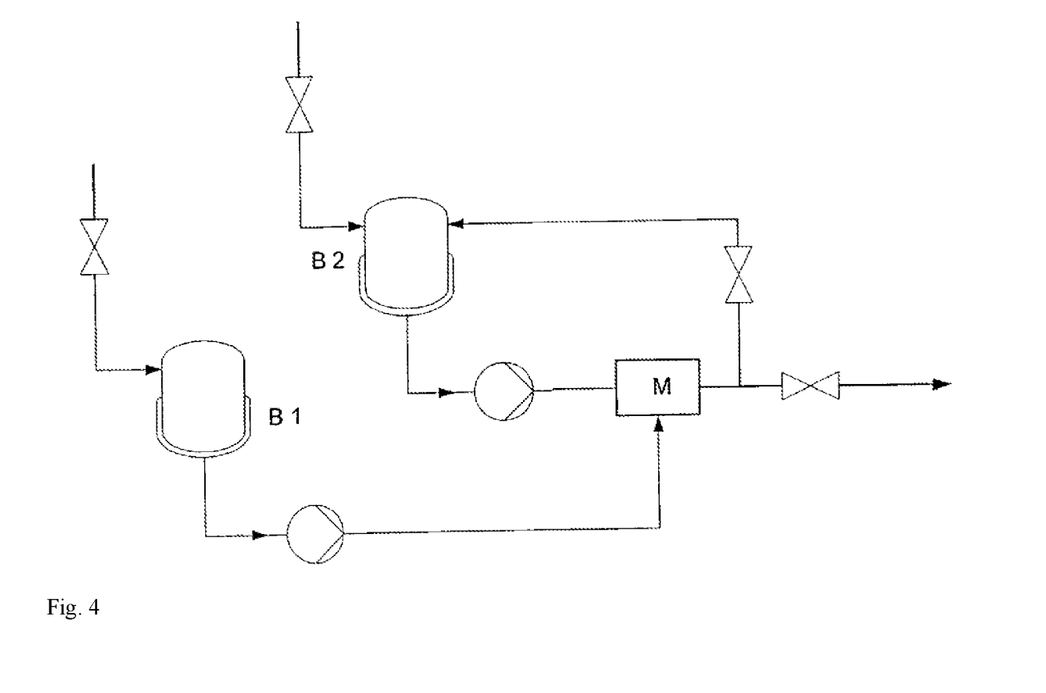
FIG. 4 illustrates a semi-batchwise process for preparing a DMC catalyst dispersion using a loop reactor.
Figure 5:
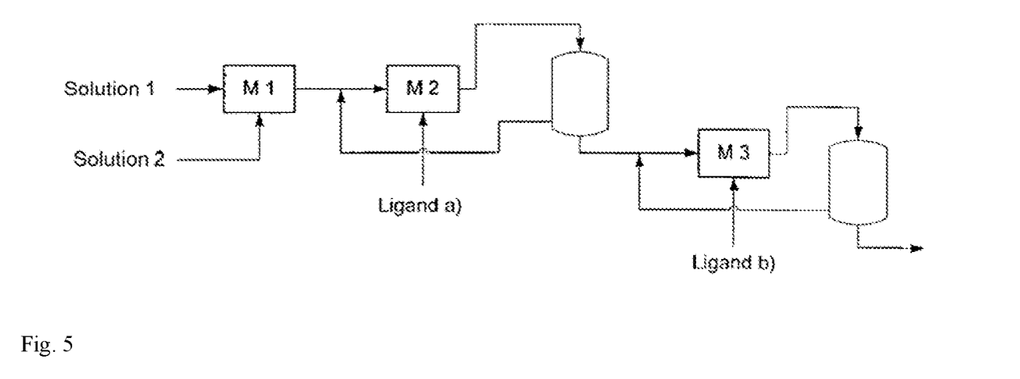
FIG. 5 illustrates a continuous process for preparing a DMC catalyst dispersion.

The DMC catalyst dispersion is prepared in step i) according to the invention using a mixing nozzle, preferably a jet disperser. Examples of suitable apparatuses are shown in FIGS. 4 and 5. FIG. 4 shows a semi-batchwise process using a loop reactor, FIG. 5 shows a continuous process for preparing the DMC catalyst dispersion.

Through the use of a mixing nozzle, especially a jet disperser, the process for the preparation of the DMC catalyst dispersion can be effected with a comparably simple apparatus setup, a low energy expenditure for the shearing, a good temperature control, and also a likewise good scalability compared to known industrial processes, in order to enable a simple implementation in existing DMC catalyst preparation processes, for example in loop reaction.

In the process according to the invention, the preparation of the double metal cyanide catalyst (DMC) comprises
  i) reaction of an aqueous solution of a cyanide-free metal salt, an aqueous solution of an alkaline metal cyanide salt, an organic complex ligand and optionally a complex-forming component, wherein the alkaline metal cyanide salt used has an alkalinity by the titration method disclosed in the Experimental of between 0.700% and 3.000% by weight sodium hydroxide (NaOH), based on the total weight of the alkaline metal cyanide salt used;
  (ii) optionally, in a second step, the separation of the solid off from the dispersion obtained from (i);
  (iii) optionally, in a third step, washing of the isolated solid with an aqueous solution of an organic complex ligand by means of a filtercake washing operation;
  (iv) and optionally, in a fourth step, drying of the solid obtained.

The aqueous solutions of the cyanide-free metal salt, for example zinc chloride, used in stoichiometric excess (at least 50 mol % based on the alkaline metal cyanide salt), and of the alkaline metal cyanide salt, for example alkaline potassium hexacyanocobaltate, are here preferably first reacted in the presence of the organic complex ligand, which may for example be tert-butanol, and optionally in the presence of the metal hydroxide, the metal carbonate and/or the metal oxide according to the invention, to form a dispersion. In one embodiment according to the invention, this DMC catalyst dispersion is prepared using a mixing nozzle, preferably a jet disperser.

In one embodiment of the process according to the invention, the reaction in step i) is effected in the presence of the metal hydroxide, the metal carbonate and/or the metal oxide according to the invention.

In one embodiment of the process according to the invention, for the reaction in step i), 0.2 to 1.0 mol, preferably 0.3 to 0.7 mol, of base equivalents, based on 1 mol of the alkaline metal cyanide salt used for the catalyst synthesis, of metal hydroxide, metal carbonate and/or metal oxide are used.

The preparation of the DMC catalyst dispersion in the semi-batchwise process using a jet disperser in combination with a loop reactor (as per FIG. 4) will be elucidated hereinbelow. In this case, either the aqueous solution of a cyanide-free metal salt can be circulated from the vessel B2 and the aqueous alkaline metal cyanide solution can be metered in from vessel B1, or vice versa. When both streams are combined in the mixing element M, a dispersion of the DMC compound is formed. The dispersion of the DMC compound can be prepared by method 1, 2 or 3, preferably by method 2 or 3. The advantage of these methods resides in the possibility of realizing a constant reactant ratio during the entire precipitation process.

Preferably, the dispersion formed after the precipitation is circulated through the jet disperser for an additional few minutes to several hours.

The nozzle diameters are in this case preferably between 2000 μm to 200 μm with pressure drops in the nozzle of between 0.1 bar to 1000 bar.

The organic complex ligand can in this case be present in the aqueous solution of the cyanide-free metal salt and/or of the alkaline metal cyanide salt, or is metered directly into the dispersion obtained after precipitation of the double metal cyanide compound (via vessel B1 or B2).

The metal hydroxide, the metal carbonate and/or the metal oxide can in this case be present in the aqueous solution of the cyanide-free metal salt and/or of the alkaline metal cyanide salt, or is metered directly into the dispersion obtained after precipitation of the double metal cyanide compound (via vessel B1 or B2). Preferably, the metal hydroxide, the metal carbonate and/or the metal oxide is/are present in the aqueous solution of the cyanide-free metal salt.

In a preferred embodiment of the process according to the invention, the organic complex ligand and the metal hydroxide, the metal carbonate and/or the metal oxide are present in the aqueous solution of the cyanide-free metal salt.

Preferably, a further complex-forming component is subsequently metered via vessel B1 or B2 into the dispersion circulating through the jet disperser. The complex-forming component is preferably used here in a mixture of water and the organic complex ligand.

The metered addition of the complex-forming component into the circuit and a subsequent recirculation preferably takes place under pressure drops in the nozzle of between 0.001 bar and 10 bar. According to the invention, the DMC catalyst dispersion can also be prepared in a continuous process as is shown by way of example in FIG. 5. The aqueous solutions of the cyanide-free metal salt and of the alkaline metal cyanide salt are reacted according to method 1, 2 or 3 in the mixing element M1 to form a dispersion. The organic complex ligand and also the metal hydroxide, the metal carbonate and/or the metal oxide may be present here in the aqueous solution of the cyanide-free metal salt and/or of the alkaline metal cyanide salt. In this case, the mixing stage M2 is dispensed with in FIG. 5. It is also possible to add the organic complex ligand and the metal hydroxide, the metal carbonate and/or the metal oxide after the precipitation of the double metal cyanide compound via the mixing element M2. To increase the residence time of the dispersion, the latter can be circulated via the mixing element M2. The complex-forming component—preferably in a mixture of water and organic complex ligand—can subsequently be added in the mixing element M3 and recirculated to increase the residence time.

In a preferred embodiment of the process according to the invention, the process temperature of the dispersion in the reaction in step i) is between 25° C. and 75° C., preferably between 30° C. and 70° C., particularly preferably between 35° C. and 65° C. and very particularly preferably between 40° C. and 60° C. Here, the process temperature corresponds to the process temperature in vessel B2 in FIG. 4.

In a preferred embodiment of the process according to the invention, in a second step (ii), the solid is separated off from the dispersion obtained from (i).

This involves isolating the solid (that is to say the precursor to the catalyst according to the invention) from the dispersion by known techniques, such as centrifugation or filtration.

Suitable filter apparatuses are described, for example, in "Ullmann's Encyclopedia of Industrial Chemistry", Vol. B 2, chapters 9 and 10, VCH, Weinheim, 1988 and H. Gasper, D. Oechsle, E. Pongratz (eds.): "Handbuch der industriellen Fest/Flüssig-Filtration" [Handbook of industrial solid-liquid filtration], Wiley-VCH Verlag GmbH, Weinheim, 2000.

The pressure gradient required for the filtration can be applied here by gravitational force, by centrifugal force (e.g. filter centrifuges), preferably by gas differential pressure (e.g. vacuum filter or pressure filter) or by liquid pressure (e.g. filter presses, drum or disk filters and also possibly crossflow filtration modules).

For removal of the catalysts, both discontinuously and continuously operated filter apparatuses may be used. Examples of discontinuously operating filter apparatuses are peeler centrifuges and inverting filter centrifuges, membrane, chamber, frame or tube filter presses, automatic filter presses, autopress devices, pressure plate, cartridge and plate filters and also vacuum and pressure suction filters. Examples of continuously operating filter apparatuses are belt filter presses, pressure and vacuum drum filters, pressure and vacuum disk filters, belt filters and crossflow filters.

For the filtration of the DMC catalyst dispersion, on the laboratory scale, vacuum or pressure filters or vacuum or pressure suction filters are particularly suitable; on the pilot plant and operational scale, pressure suction filters, filter presses and automatic filter presses are particularly suitable.

On the pilot plant scale, membrane filter presses have proven to be particularly suitable. These, with the aid of a suitable filter cloth, preferably a membrane cloth, enable the filtration of the DMC catalyst dispersion on the basis of an applied liquid pressure gradient.

The filtration is generally conducted at temperatures of from 10 to 80° C. The pressure differences applied may be 0.001 bar to 200 bar, preferably 0.1 bar to 100 bar, particularly preferably 0.1 bar to 25 bar, the pressure difference applied depending on the apparatus used.

The isolated solid obtained in step (ii) can be washed by means of redispersion or filtercake washing.

In a preferred embodiment of the process according to the invention, in a third step (iii), the isolated solid is washed with an aqueous solution of an organic complex ligand by means of a filtercake washing operation.

The filtercake washing is performed here preferably by slurrying or preferably by flow-through washing. Here, the washing liquid flows through the cake and the liquid previously present in the cake is displaced, with diffusion effects also becoming effective. The removal of moisture from the washed cake can be effected by gas differential pressure, centrifugal force or mechanical pressing, or preferably in a combined manner by removal of moisture by gas differential pressure followed by mechanical pressing out. The pressure for the mechanical pressing out can be applied in this case both mechanically and by membranes.

With the aid of the filtercake washing, the preparation process is simplified and as a result also accelerated. The preferred ratio of washing liquid to filtercake volume lies at the amounts which bring about a complete exchange of the amount of liquid present in the original filtercake.

In an alternatively preferred embodiment variant of the process according to the invention, the isolated solid is subsequently washed in a third process step with an aqueous solution of the organic complex ligand (e.g. by redispersion and subsequent reisolation by filtration or centrifugation). This makes it possible to remove, for example, water-soluble by-products such as potassium chloride from the catalyst according to the invention. The amount of the organic complex ligand in the aqueous wash solution is preferably between 40% and 80% by weight, based on the overall solution.

Complex-forming component is optionally added to the aqueous wash solution in the third step, preferably in the range between 0.5% and 5% by weight, based on the overall solution.

It is also advantageous to wash the isolated solid more than once. Preferably, in a first wash step (iii-1), an aqueous solution of the organic complex ligand is used for washing (for example by redispersion and subsequent reisolation by filtration or centrifugation), in order in this way to remove, for example, water-soluble by-products such as potassium chloride from the catalyst according to the invention. It is particularly preferable when the amount of the organic complex ligand in the aqueous wash solution is between 40% and 80% by weight, based on the overall solution of the first wash step. In the further wash steps (iii-2), either the first wash step is repeated once or more than once, preferably once to three times, or preferably a nonaqueous solution, for example a mixture or solution of organic complex ligand and complex-forming component (preferably in the range between 0.5% and 5% by weight, based on the total amount of the wash solution of step (iii-2)) (preferably in the range between 1% and 20% by weight, based on the total amount of the wash solution of step (iii-2)), is used as wash solution and the solid is washed with it once or more than once, preferably once to three times.

In a preferred embodiment of the process according to the invention, in a fourth step (iv), the solid obtained is subsequently dried.

Here, the isolated and optionally washed solid is subsequently dried, optionally after pulverization, at temperatures of generally 20-100° C. and at pressures of generally 0.1 mbar to standard pressure (1013 mbar).

In a preferred embodiment of the process according to the invention, steps (ii) and (iii) are performed in a filter press.

It has proven to be advantageous to press out the washed filtercake after the filtercake washing at pressures of from 0.5 to 200 bar, preferably at the highest possible pressures. This can be done, for example, directly following the filtercake washing in a filter press or by means of other suitable pressing apparatuses which enable a mechanical pressure to be applied so that the liquid present in the filtercake can escape through a membrane or a suitable filter cloth. The mechanical removal of moisture from the filtercake, which follows the washing of the filtercake and is preferably to be carried out prior to the drying, can preferably take place in the filter press, preferably by mechanical pressing out via a pressure exerted onto the membranes. The mechanical removal of moisture preferably leads to a maximum removal of the washing liquid from the filtercake.

The DMC catalyst is subsequently dried at temperatures of about 20 to 100° C. and at pressures of about 0.1 mbar to standard pressure (1013 mbar). Contact dryers and convection dryers and also spray dryers are suitable for this. The drying is preferably also performed directly in the apparatuses for the mechanical removal of liquid, where these are suitable for this (e.g. suction dryer, centrifugal dryer, "hot filter press").

In a particularly preferred embodiment of the process according to the invention, steps (ii), (iii) and (iv) are performed in a heatable filter press.

The process preferably employs the heatable filter press. This is constructed as a conventional filter press with a membrane package. In terms of design, the membrane plates to be used differ from conventional membrane plates in that a heating medium can flow through the space behind the membrane. Liquid-tight (so-called "drip-" or "gas-tight") membrane filter plates are preferably used.

The heated heating medium flows past the filtercakes on the rear side of the press membranes, completely separated from the filtercake by the press membrane and the filter medium, and in the process heats the filtercakes. The pressing medium is in this case under a sufficiently high pressure to ensure contact of the membranes with the filtercakes. The filtercakes can be heated on one or both sides. Heating on both sides is favorable with regard to the drying time.

A vacuum is applied on the filtrate side to assist with the drying process. This vacuum can for example be generated by a liquid-ring pump. The vapor stream suctioned off is cooled upstream of the vacuum pump in order to condense out the volatile constituents (e.g. tert-butanol and water). Measured and controlled variables are the amount condensed out, the pressure in the filtrate system of the press and the filtercake temperature.

In the process described, the membrane press pressures are preferably 0.1 bar to 10 bar. Temperatures of the pressing and heating medium are 30° C. to 80° C., preferably 40° C. to 60° C. The filtrate-side pressure is preferably less than 100 mbar. The flow rate of the heating medium should be chosen to be sufficiently high that there is a good heat transfer between the heating medium and the product. Drying times are in general a few minutes to a plurality of hours, typically one to ten hours. Residual moisture contents of below the target value of approx. 5% are reliably achieved with this type of drying.

In further process steps, the product thus isolated and freed from secondary components can be ground and packaged.

The present invention further provides the DMC catalyst prepared by the process according to the invention.

The present invention further provides the use of the DMC catalysts prepared by the process according to the invention in a process for preparing polyoxyalkylene polyols, preferably polyether polyols by polyaddition of alkylene oxides onto starter compounds having active hydrogen atoms and/or polyethercarbonate polyols by polyaddition of alkylene oxides onto starter compounds having active hydrogen atoms in the presence of carbon dioxide.

The DMC catalysts prepared by the process according to the invention can by virtue of their extraordinarily high activity frequently be used in very low concentrations (25 ppm and less, based on the amount of the polyoxyalkylene polyol to be prepared, preferably the polyether polyol). If the polyoxyalkylene polyols, preferably polyether polyols, prepared in the presence of the DMC catalysts prepared by the process according to the invention are used to prepare polyurethanes, the removal of the catalyst from the polyoxyalkylene polyol, preferably polyether polyol, can be dispensed with without disadvantageously affecting the product qualities of the polyurethane obtained.

EXAMPLES

OH numbers were determined in accordance with the procedure of DIN 53240. Viscosities were determined by rotary viscometer (Physica MCR 51, manufacturer: Anton Paar) in accordance with the procedure of DIN 53018.

The alkalinity (in % by weight sodium hydroxide (NaOH)) of the alkaline metal cyanide salt used was determined at 25° C. on a 24% by weight aqueous solution by titration with HCl (0.1 mol/l).

Preparation of the DMC Catalysts:

Example 1 (Comparative)

The catalyst was prepared using an apparatus as per FIG. 4 from WO 01/39883 A1.

In a loop reactor containing a jet disperser as per FIG. 2 from WO 01/39883 A1 having one bore (diameter 0.7 mm) was circulated in step i) a solution of 258 g of zinc chloride and 1.43 g of NaOH (0.46 mol(NaOH)/1 mol(Khex)) in 937 g of distilled water and 135 g of tert-butanol at 50° C. (determined in the vessel D2 in FIG. 4 of WO 01/39883 A1). To this was metered in a solution of 26 g of potassium hexacyanocobaltate (Khex) having an alkalinity content of 0.400% by weight NaOH in 332 g of distilled water. The pressure drop in the jet disperser was 2.9 bar. Subsequently, the dispersion formed was circulated for 60 min at 50° C. with a pressure drop in the jet disperser of 2.9 bar. Thereafter, a mixture of 5.7 g of tert-butanol, 159 g of distilled water and 27.6 g of polypropylene glycol 1000 (PPG-1000) was metered in and the dispersion was then circulated for 80 min at 50° C. with a pressure drop in the jet disperser of 2.9 bar.

230 g of the dispersion obtained were filtered in a pressure suction filter with filter area 20 cm$^3$ (step ii)), and then washed with a mixture of 82 g of tert-butanol, 42.3 g of distilled water and 1.7 g of polypropylene glycol 1000 (step iii)). The washed filtercake was squeezed mechanically between two strips of filter paper and finally dried at 60° C. under high vacuum at about 0.05 bar (absolute) for 2 h (step iv)). The theoretical total alkalinity of the DMC catalyst is 1.534 g (NaOH), as the sum of the masses of the alkalinity of the potassium hexacyanocobaltate (Khex) used of 0.104 g (NaOH) and of the mass of the sodium hydroxide used in step i) of 1.43 g.

Example 2 (Comparative)

In a loop reactor containing a jet disperser as per FIG. 2 from WO 01/39883 A1 having one bore (diameter 0.7 mm) was circulated in step i) a solution of 258 g of zinc chloride and 1.36 g of NaOH (0.43 mol(NaOH)/1 mol(Khex)) in 937 g of distilled water and 135 g of tert-butanol at 50° C. (determined in the vessel D2 in FIG. 4 of WO 01/39883 A1). To this was metered in a solution of 26 g of potassium hexacyanocobaltate having an alkalinity content of 0.660% by weight NaOH in 332 g of distilled water. The pressure drop in the jet disperser was 2.9 bar. Subsequently, the dispersion formed was circulated for 60 min at 50° C. with a pressure drop in the jet disperser of 2.9 bar. Thereafter, a mixture of 5.7 g of tert-butanol, 159 g of distilled water and 27.6 g of polypropylene glycol 1000 (PPG-1000) was metered in and the dispersion was then circulated for 80 min at 50° C. with a pressure drop in the jet disperser of 2.9 bar.

230 g of the dispersion obtained were filtered in a pressure suction filter with filter area 20 cm$^3$ (step ii)), and then washed with a mixture of 82 g of tert-butanol, 42.3 g of distilled water and 1.7 g of polypropylene glycol 1000 (step iii)). The washed filtercake was squeezed mechanically between two strips of filter paper and finally dried at 60° C. under high vacuum at about 0.05 bar (absolute) for 2 h (step iv)). The theoretical total alkalinity of the DMC catalyst is 1.532 g (NaOH), as the sum of the masses of the alkalinity of the potassium hexacyanocobaltate (Khex) used of 0.172 g (NaOH) and of the mass of the sodium hydroxide used in step i) of 1.36 g.

Example 3

In a loop reactor containing a jet disperser as per FIG. 2 from WO 01/39883 A1 having one bore (diameter 0.7 mm) was circulated in step i) a solution of 258 g of zinc chloride and 1.31 g of NaOH (0.42 mol(NaOH)/1 mol(Khex)) in 937 g of distilled water and 135 g of tert-butanol at 50° C. (determined in the vessel D2 in FIG. 4 of WO 01/39883 A1). To this was metered in a solution of 26 g of potassium hexacyanocobaltate having an alkalinity content of 0.855% by weight NaOH in 332 g of distilled water. The pressure drop in the jet disperser was 2.9 bar. Subsequently, the dispersion formed was circulated for 60 min at 50° C. with a pressure drop in the jet disperser of 2.9 bar. Thereafter, a mixture of 5.7 g of tert-butanol, 159 g of distilled water and 27.6 g of polypropylene glycol 1000 (PPG-1000) was metered in and the dispersion was then circulated for 80 min at 50° C. with a pressure drop in the jet disperser of 2.9 bar.

230 g of the dispersion obtained were filtered in a pressure suction filter with filter area 20 cm$^3$ (step ii)), and then washed with a mixture of 82 g of tert-butanol, 42.3 g of distilled water and 1.7 g of polypropylene glycol 1000 (step iii)). The washed filtercake was squeezed mechanically between two strips of filter paper and finally dried at 60° C. under high vacuum at about 0.05 bar (absolute) for 2 h (step iv)). The theoretical total alkalinity of the DMC catalyst is 1.532 g (NaOH), as the sum of the masses of the alkalinity of the potassium hexacyanocobaltate (Khex) used of 0.222 g (NaOH) and of the mass of the sodium hydroxide used in step i) of 1.31 g.

Example 4

In a loop reactor containing a jet disperser as per FIG. 2 from WO 01/39883 A1 having one bore (diameter 0.7 mm) was circulated in step i) a solution of 258 g of zinc chloride and 1.26 g of NaOH (0.40 mol(NaOH)/1 mol(Khex)) in 937 g of distilled water and 135 g of tert-butanol at 50° C. (determined in the vessel D2 in FIG. 4 of WO 01/39883 A1). To this was metered in a solution of 26 g of potassium hexacyanocobaltate having an alkalinity content of 1.067% by weight NaOH in 332 g of distilled water. The pressure drop in the jet disperser was 2.9 bar. Subsequently, the dispersion formed was circulated for 60 min at 50° C. with a pressure drop in the jet disperser of 2.9 bar. Thereafter, a mixture of 5.7 g of tert-butanol, 159 g of distilled water and 27.6 g of polypropylene glycol 1000 (PPG-1000) was metered in and the dispersion was then circulated for 80 min at 50° C. with a pressure drop in the jet disperser of 2.9 bar.

230 g of the dispersion obtained were filtered in a pressure suction filter with filter area 20 cm$^3$ (step ii)), and then washed with a mixture of 82 g of tert-butanol, 42.3 g of distilled water and 1.7 g of polypropylene glycol 1000 (step iii)). The washed filtercake was squeezed mechanically between two strips of filter paper and finally dried at 60° C. under high vacuum at about 0.05 bar (absolute) for 2 h (step iv)). The theoretical total alkalinity of the DMC catalyst is 1.537 g (NaOH), as the sum of the masses of the alkalinity of the potassium hexacyanocobaltate (Khex) used of 0.277 g (NaOH) and of the mass of the sodium hydroxide used in step i) of 1.26 g.

Example 5

In a loop reactor containing a jet disperser as per FIG. 2 from WO 01/39883 A1 having one bore (diameter 0.7 mm) was circulated in step i) a solution of 258 g of zinc chloride and 1.20 g of NaOH (0.38 mol(NaOH)/1 mol(Khex)) in 937 g of distilled water and 135 g of tert-butanol at 50° C. (determined in the vessel D2 in FIG. 4 of WO 01/39883 A1). To this was metered in a solution of 26 g of potassium hexacyanocobaltate having an alkalinity content of 1.279% by weight NaOH in 332 g of distilled water. The pressure drop in the jet disperser was 2.9 bar. Subsequently, the dispersion formed was circulated for 60 min at 50° C. with a pressure drop in the jet disperser of 2.9 bar. Thereafter, a mixture of 5.7 g of tert-butanol, 159 g of distilled water and 27.6 g of polypropylene glycol 1000 (PPG-1000) was metered in and the dispersion was then circulated for 80 min at 50° C. with a pressure drop in the jet disperser of 2.9 bar.

230 g of the dispersion obtained were filtered in a pressure suction filter with filter area 20 cm$^3$ (step ii)), and then washed with a mixture of 82 g of tert-butanol, 42.3 g of distilled water and 1.7 g of polypropylene glycol 1000 (step iii)). The washed filtercake was squeezed mechanically between two strips of filter paper and finally dried at 60° C. under high vacuum at about 0.05 bar (absolute) for 2 h (step iv)). The theoretical total alkalinity of the DMC catalyst is 1.533 g (NaOH), as the sum of the masses of the alkalinity of the potassium hexacyanocobaltate (Khex) used of 0.333 g (NaOH) and of the mass of the sodium hydroxide used in step i) of 1.20 g.

Example 6

In a loop reactor containing a jet disperser as per FIG. 2 from WO 01/39883 A1 having one bore (diameter 0.7 mm)

was circulated in step i) a solution of 258 g of zinc chloride and 1.10 g of NaOH (0.35 mol(NaOH)/1 mol(Khex)) in 937 g of distilled water and 135 g of tert-butanol at 50° C. (determined in the vessel D2 in FIG. 4 of WO 01/39883 A1). To this was metered in a solution of 26 g of potassium hexacyanocobaltate having an alkalinity content of 1.690% by weight NaOH in 332 g of distilled water. The pressure drop in the jet disperser was 2.9 bar. Subsequently, the dispersion formed was circulated for 60 min at 50° C. with a pressure drop in the jet disperser of 2.9 bar. Thereafter, a mixture of 5.7 g of tert-butanol, 159 g of distilled water and 27.6 g of polypropylene glycol 1000 (PPG-1000) was metered in and the dispersion was then circulated for 80 min at 50° C. with a pressure drop in the jet disperser of 2.9 bar.

230 g of the dispersion obtained were filtered in a pressure suction filter with filter area 20 cm$^3$ (step ii)), and then washed with a mixture of 82 g of tert-butanol, 42.3 g of distilled water and 1.7 g of polypropylene glycol 1000 (step iii)). The washed filtercake was squeezed mechanically between two strips of filter paper and finally dried at 60° C. under high vacuum at about 0.05 bar (absolute) for 2 h (step iv)). The theoretical total alkalinity of the DMC catalyst is 1.539 g (NaOH), as the sum of the masses of the alkalinity of the potassium hexacyanocobaltate (Khex) used of 0.439 g (NaOH) and of the mass of the sodium hydroxide used in step i) of 1.10 g.

Catalyst Test ("8K Diol Stressed Test"):

The DMC catalysts were tested in the so-called "8K diol stressed test". Here, a polypropylene glycol having a calculated OH number=14 mg KOH/g, that is to say molecular weight=8000 g/mol ("8K diol") was prepared proceeding from a bifunctional polypropylene glycol starter having an OH number=147 mg KOH/g ("Arcol Polyol 725" from Covestro) with a short propylene oxide metering time (30 minutes). The decisive evaluation criterion for the catalyst quality/activity in this test is the viscosity of the polyol obtained, with a DMC catalyst of increased quality/activity leading to a lower 8K diol viscosity.

General Implementation:

A 1 liter stainless steel reactor was initially charged with 75 g of a bifunctional polypropylene glycol starter (OH number=147 mg KOH/g) and 30.7 mg of DMC catalyst. After 5 cycles of nitrogen/vacuum exchange between 0.1 and 3.0 bar (absolute), the reactor contents were heated to 130° C. with stirring (800 rpm). The mixture was then stripped with nitrogen for 30 min at 130° C. and 100 mbar (absolute). 7.5 g of propylene oxide were then added at 130° C. and 100 mbar (absolute) to activate the catalyst. The catalyst activation manifested in an accelerated pressure drop in the reactor. After the catalyst had been activated, the remaining propylene oxide (685.7 g) was metered in within 30 min at 130° C. with stirring (800 rpm). After a post-reaction time of 30 min at 130° C., volatile constituents were distilled off under reduced pressure (<10 mbar) at 90° C. for 30 min. The product was then cooled down to room temperature and removed from the reactor.

The OH number and viscosity (25° C.) of the product obtained were measured. In the event of a deviation of the measured OH number from the calculated OH number (14 mg KOH/g), a "corrected viscosity" was determined from the measured viscosity using the following formula:

corrected viscosity (25° C.)=measured viscosity (25° C.)+659*(OHN−14)

The results of the catalyst tests in the "8K diol stressed test" are summarized in table 1.

TABLE 1

| Catalyst test/Example | DMC catalyst/Example | Khex alkalinity [% by weight NaOH]/ [mol(NaOH)/mol (Khex)] | n(NaOH step i)/n(Khex) [mobmol]$^{a)}$ | Theoretical total alkalinity [g(NaOH)]$^{b)}$ | OH number [mg KOH/g] | Viscosity 25° C./ measured [mPas] | Viscosity 25° C./ corrected [mPas] |
|---|---|---|---|---|---|---|---|
| 7 (comp.) | 1 (comp.) | 0.400/0.033 | 0.46 | 1.534 | 14.0 | 5765 | 5765 |
| 8 (comp.) | 2 (comp.) | 0.660/0.055 | 0.43 | 1.532 | 13.7 | 5820 | 5622 |
| 9 | 3 | 0.855/0.072 | 0.42 | 1.532 | 13.9 | 5100 | 5034 |
| 10 | 4 | 1.067/0.090 | 0.40 | 1.537 | 14.3 | 4745 | 4943 |
| 11 | 5 | 1.279/0.108 | 0.38 | 1.533 | 14.0 | 4940 | 4940 |
| 12 | 6 | 1.690/0.143 | 0.35 | 1.539 | 14.0 | 5095 | 5095 |

$^{a)}$Sodium hydroxide (NaOH) added in step i) as base equivalent based on 1 mol of the alkaline potassium hexacyanocobaltate (Khex) used for the catalyst synthesis as alkaline metal cyanide salt
$^{b)}$Theoretical total alkalinity of the DMC catalyst in [g NaOH], this mass being the sum of the mass of the alkalinity of the potassium hexacyanocobaltate (Khex) used [g (NaOH)] and the mass of the sodium hydroxide used in step i).

The results show that DMC catalysts prepared using alkaline potassium hexacyanocobaltate (Khex) with an alkalinity of between 0.700% and 3.000% by weight NaOH, for the same theoretical total alkalinity of the DMC catalyst, lead to lower viscosity values of the polyols in the "8K diol stressed test".

The invention claimed is:

1. A process for preparing a double metal cyanide catalyst (DMC) comprising reacting an aqueous solution of a cyanide-free metal salt, an aqueous solution of an alkaline metal cyanide salt, an organic complex ligand and optionally a complex-forming component, wherein the metal cyanide salt comprises potassium hexacyanocobaltate (III), potassium hexacyanoferrate (II), potassium hexacyanoferrate (III), calcium hexacyanocobaltate (III), lithium hexacyanocobaltate (III) or a mixture thereof, wherein the organic complex ligand comprises dimethoxyethane, tert-butanol, 2-methyl-3-buten-2-ol, 2-methyl-3-butyn-2-ol, ethylene glycol mono-tert-butyl ether, 3-methyl-3-oxetanemethanol, or a mixture thereof, and wherein the alkaline metal cyanide salt has an alkalinity, determined at 25° C. on a 24% by weight aqueous solution by titration with 0.1 mol/liter of hydrochloric acid, of between 0.700% and 3.000% by weight sodium hydroxide, based on the total weight of the alkaline metal cyanide salt used, and wherein the alkaline metal cyanide salt contains a metal hydroxide, a metal carbonate, a metal oxide, or a mixture of any two or more thereof and is obtained by addition of the metal hydroxide, the metal carbonate, the metal oxide, or the mixture of any two or more thereof, during the preparation of the alkaline metal cyanide salt.

2. The process as claimed in claim 1, wherein the alkalinity of the alkaline metal cyanide salt is between 0.700% and 2.000% by weight NaOH.

3. The process as claimed in claim 2, wherein the alkalinity of the alkaline metal cyanide salt is between 0.800% and 1.500% by weight NaOH.

4. The process as claimed in claim 1, wherein the alkaline metal cyanide salt is obtained by reaction of a metal cyanide salt with the metal hydroxide, the metal carbonate, the metal oxide, or the mixture of any two or more thereof.

5. The process as claimed in claim 4, wherein the metal cyanide salt comprises potassium hexacyanocobaltate (III).

6. The process as claimed in claim 1, wherein one or more metals of the first or second main group of the periodic table of the elements are present in the alkaline metal cyanide salt.

7. The process as claimed in claim 1, wherein the metal hydroxide, metal oxide, metal carbonate, or mixture of any two or more thereof comprises sodium carbonate, sodium hydroxide, potassium hydroxide, potassium carbonate, calcium oxide, calcium hydroxide, barium hydroxide, barium oxide, or a mixture of any two or more thereof.

8. The process as claimed in claim 7, wherein the reaction is effected in the presence of the metal hydroxide, the metal carbonate, the metal oxide, or the mixture of any two or more thereof.

9. The process as claimed in claim 7, wherein, for the reaction, 0.2 to 1.0 mol of base equivalents, based on 1 mol of the alkaline metal cyanide salt used for the catalyst synthesis, of metal hydroxide, metal carbonate, metal oxide, or mixture of any two or more thereof is used.

10. The process as claimed in claim 9, wherein, for the reaction, 0.3 to 0.7 mol, of base equivalents, based on 1 mol of the alkaline metal cyanide salt used for the catalyst synthesis, of metal hydroxide, metal carbonate, metal oxide, or mixture of any two or more thereof is used.

11. The process as claimed in claim 1 wherein the aqueous solution comprises the complex-forming component, wherein the complex-forming component comprises a polyether.

12. The process as claimed in claim 11, wherein the complex-forming component comprises a polyether polyol.

13. The process as claimed in claim 1, wherein the organic complex ligand comprises tert-butanol.

14. The process as claimed in claim 1, wherein the reaction is effected using a mixing nozzle.

15. The process as claimed in claim 14, wherein the mixing nozzle comprises a jet disperser.

16. A double metal cyanide catalyst (DMC) obtained by the process of claim 1.

17. A polyoxyalkylene polyol prepared using the double metal cyanide catalyst of claim 16.

18. The polyoxyalkylene polyol of claim 17, wherein the polyoxyalkylene polyol comprises a polyether polyol and/or polyethercarbonate polyol.

19. A process for preparing a double metal cyanide catalyst (DMC) comprising reacting an aqueous solution of a cyanide-free metal salt, an aqueous solution of an alkaline metal cyanide salt, an organic complex ligand and a complex-forming component comprising a polyether polyol, wherein the metal cyanide salt comprises potassium hexacyanocobaltate (III), potassium hexacyanoferrate (II), potassium hexacyanoferrate (III), calcium hexacyanocobaltate (III), lithium hexacyanocobaltate (III) or a mixture thereof,
wherein the organic complex ligand comprises dimethoxyethane, tert-butanol, 2-methyl-3-buten-2-ol, 2-methyl-3-butyn-2-ol, ethylene glycol mono-tert-butyl ether, 3-methyl-3-oxetanemethanol, or a mixture thereof, and
wherein the alkaline metal cyanide salt has an alkalinity, determined at 25° C. on a 24% by weight aqueous solution by titration with 0.1 mol/liter of hydrochloric acid, of between 0.700% and 3.000% by weight sodium hydroxide, based on the total weight of the alkaline metal cyanide salt used, and
wherein the alkaline metal cyanide salt contains a metal hydroxide, a metal carbonate, a metal oxide, or a mixture of any two or more thereof.

* * * * *